(12) United States Patent
Caves et al.

(10) Patent No.: US 6,434,151 B1
(45) Date of Patent: Aug. 13, 2002

(54) COMMUNICATIONS SYSTEM AND METHOD

(75) Inventors: Keith Caves, Sawbridgeworth; David John Stacey, Stanstead Abbotts, both of (GB)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/111,906

(22) Filed: Jul. 8, 1998

(30) Foreign Application Priority Data

Nov. 12, 1997 (GB) .............................. 9723932

(51) Int. Cl.[7] .............................................. H04L 12/28
(52) U.S. Cl. .................... 370/395.2; 370/252; 370/477; 375/240
(58) Field of Search ................................ 370/466, 389, 370/395, 252, 395.1, 397, 395.2, 477; 375/240; 341/51

(56) References Cited

U.S. PATENT DOCUMENTS 6,169,738 B1 * 1/2001 Sriram et al. ............... 370/395
6,266,343 B1 * 7/2001 Caves ......................... 370/466

FOREIGN PATENT DOCUMENTS

| GB | 2 291 561 A | 5/1994 |
|----|-------------|--------|
| GB | 2 309 362 A | 1/1996 |
| GB | 2 313 018 A | 11/1996 |

* cited by examiner

*Primary Examiner*—Hassan Kizou
*Assistant Examiner*—John Pezzlo
(74) *Attorney, Agent, or Firm*—Lee, Mann, Smith, McWilliams, Sweeney & Ohlson (57) ABSTRACT

In a communications system in which narrow band, e.g. voice, channels are carried in packet form over an asynchronous network, each channel is encoded to reduce its bit rate so as to reduce demands on band width. The encoding of each channel is effected via an algorithm selected from a group of algorithms associated with that channel. The algorithms forming the group are identified to a receiver station performing a decoding function via information provided in each packet header. The particular algorithm currently in use is determined implicitly from the packet length or from a combination of the packet length and a discriminator field provided in the packet header.

14 Claims, 6 Drawing Sheets

| Bits | 8 | 7 | 6 | 5 | 4 | 3 | 2 | 1 |
|------|---|---|---|---|---|---|---|---|
| SSCS Selection Identifier | 0 | 0 | 0 | 0 | 0 | 0 | 1 | 0 |
| SSCS Selection | 0 | 0 | 0 | 0 | 1 | 0 | | |
| Qualifier | | | | | | | 0 | 1 |
| Encoding Profile Identifier | 0 | 0 | 0 | 0 | 1 | 0 | 0 | 1 |

*Figure 5*

| Bits | 8 | 7 | 6 | 5 | 4 | 3 | 2 | 1 |
|---|---|---|---|---|---|---|---|---|
| \multicolumn{9}{c}{SSCS Selection Identifier} | | | | | | | | |
| | 0 | 0 | 0 | 0 | 0 | 0 | 1 | 0 |
| \multicolumn{7}{c}{SSCS Selection} | \multicolumn{2}{c}{Qualifier} | | | | | | | |
| | 0 | 0 | 0 | 0 | 0 | 0 | 1 | 0 |
| \multicolumn{9}{c}{Encoding Profile Identifier} | | | | | | | | |
| | 0 | 0 | 0 | 0 | 0 | 0 | 0 | 0 |
| \multicolumn{4}{c}{No. of Algorithms} | \multicolumn{4}{c}{SN Modulus} | | | | | | | |
| | 0 | 1 | 0 | 0 | 0 | 1 | 0 | 0 |
| \multicolumn{9}{c}{Algorithm Identifier (No. 1)} | | | | | | | | |
| | 0 | 0 | 0 | 0 | 0 | 0 | 0 | 0 |
| \multicolumn{9}{c}{Packet Length} | | | | | | | | |
| | 0 | 0 | 0 | 1 | 0 | 0 | 0 | 0 |
| \multicolumn{4}{c}{UUI Discriminator} | \multicolumn{4}{c}{Reserved} | | | | | | | |
| | 0 | 0 | 0 | 0 | 0 | 0 | 0 | 0 |
| \multicolumn{9}{c}{Algorithm Identifier (No. 2)} | | | | | | | | |
| | 0 | 0 | 0 | 0 | 0 | 1 | 0 | 1 |
| \multicolumn{9}{c}{Packet Length} | | | | | | | | |
| | 0 | 1 | 0 | 1 | 0 | 0 | 0 | 0 |
| \multicolumn{4}{c}{UUI Discriminator} | \multicolumn{4}{c}{Reserved} | | | | | | | |
| | 1 | 0 | 0 | 0 | 0 | 0 | 0 | 0 |
| \multicolumn{9}{c}{Algorithm Identifier (No. 3)} | | | | | | | | |
| | 0 | 0 | 0 | 0 | 0 | 1 | 1 | 0 |
| \multicolumn{9}{c}{Packet Length} | | | | | | | | |
| | 1 | 1 | 0 | 0 | 1 | 0 | 1 | 0 |
| \multicolumn{4}{c}{UUI Discriminator} | \multicolumn{4}{c}{Reserved} | | | | | | | |
| | 0 | 0 | 0 | 0 | 0 | 0 | 0 | 0 |
| \multicolumn{9}{c}{Algorithm Identifier (No. 4)} | | | | | | | | |
| | 0 | 0 | 0 | 0 | 1 | 0 | 0 | 1 |
| \multicolumn{9}{c}{Packet Length} | | | | | | | | |
| | 1 | 1 | 0 | 0 | 1 | 0 | 1 | 0 |
| \multicolumn{4}{c}{UUI Discriminator} | \multicolumn{4}{c}{Reserved} | | | | | | | |
| | 1 | 0 | 0 | 0 | 0 | 0 | 0 | 0 |

*Figure 6*

COMMUNICATIONS SYSTEM AND METHOD

This invention relates to telecommunications systems and in particular to an apparatus and method for selecting voice encoding algorithms in such systems.

BACKGROUND OF THE INVENTION

A recent development in telecommunications technology has been the introduction of asynchronous networks in which traffic is carried in packets or cells, the technique generally being referred to as the asynchronous transfer mode (ATM). In such a network, user traffic is packaged into cells each of which is provided with a header containing supervisory or overhead information. As each packet is filled, it is routed across the network to its desired destination, the routing being determined from the packet header information. A potential problem in such a system is the assembly delay inherent in filling a packet with user information or traffic. For high bit rate users the packets are filled rapidly and the delay is therefore insignificant. For low bit rate users, for example voice traffic which is typically carried in 64 kbit/channels, the assembly delay required to fill a packet can become unacceptably long. One approach to this problem is the insertion of padding or dummy traffic into the packets so as to increase the rate at which they are filled. This is considered undesirable as it is an inefficient use of the available bandwidth. To address this problem various workers have introduced ATM transmission techniques in which information streams, typically voice traffic, from a number of low bit rate users is multiplexed on to a single ATM connection. This increases the rate at which individual ATM packets are filled thus overcoming the assembly delay problem. A particular protocol defining this form of transmission is that described in the ITU-T AAL2 standard recommendation 1.363.2.

In the multiplexed connection, each individual information stream can carry voice information that has been encoded using one of a number of available algorithms. This encoding reduces the bit rate and thus frees up bandwidth to allow higher volume of voice traffic to be accommodated. The range of algorithms available for this purpose enables voice calls to be transported at a corresponding range of bit rates. This offers users the ability to reduce or increase the amount of bandwidth required to support voice calls with a corresponding loss or gain in voice quality. This also allows operators to offer premium voice services at a higher cost to the user. In addition to voice encoding, silence suppression may also be used to reduce the amount of bandwidth required for calls.

It will be appreciated that where a number of users share a single ATM connection for voice traffic, they will not in general all use the same algorithm for voice encoding. Each user will use an algorithm appropriate to the particular call and to the class of service that he or she enjoys. Further, it is possible for more than one algorithm to be employed during an individual call, e.g. to overcome temporary congestion where a call may be 'downspeeded' to reduce its coding rate and thus save on bandwidth. As soon as this congestion disappears, the call can be 'upsped' back to the original coding rate. In order to ensure satisfactory operation of such a system, it is of course necessary that the interworking functions (IWF) at both ends of the ATM connection are made aware of the encoding algorithm currently in use on each individual call. This is at present performed from explicit protocol control information carried in the headers of the AAL2 packets transporting the user information streams. The AAL2 Negotiation Procedure (ANP) as defined in the ITU-T standard draft recommendation I.anp is used to define, during the call set up procedure, the meaning of this protocol control information. This meaning is conveyed by reference to a standard profile.

As discussed above, a number of coding algorithms may be used in the course of a single call. To address this scenario, the ITU-T recommendation currently designated as I.trunk defines a number of coding profiles each containing a number of coding algorithms that belong to a particular coding family. A predetermined profile is selected for a call and conveyed from the transmitting IWF to the receiving IWF by means of the ANP. Any algorithm within that profile is then available for use during that call. Each of the algorithms within a profile can be identified within the header of an AAL2 CPS packet (or minicell) by reference to two fields. These are the Length Indicator (LI) field and the User-to-User Information (UUI) field whose meanings are fixed by the ANP such that each algorithm can be uniquely identified from CPS packet to CPS packet throughout a call. However, it is a prerequisite of this procedure that only the standard algorithm profiles can be employed.

While this approach provides an effective method of identifying coding algorithms to the receiving interworking function (IWF), it suffers from the disadvantage that only a small number of encoding algorithm profiles can be identified in this way and there is no mechanism for identifying a non-standard profile of encoding algorithms. A voice call may thus have to employ a less than ideal profile as this is all that is currently available from the standard profile set.

SUMMARY OF THE INVENTION

An object of the invention is to minimise or to overcome the above disadvantage.

A further object of the invention is to provide an improved method of identifying algorithms used for voice encoding in a telecommunications system.

According to the invention there is provided a method of transmitting a plurality of narrow band digital traffic channels in packets over an asynchronous packet switched network between a transmitter station and a receiver station, wherein each said channel is encoded via one of a set of encoding algorithms associated with that channel, wherein the identity of the algorithnms in each channel set of algorithms is conveyed to the receiver at call set-up between the transmitter and receiver, and wherein the identity of that algorithm emploed to encode a said channel is conveyed via header information provided in the packets carrying that channel.

According to another aspect of the invention there is provided a method of transmitting a plurality of narrow band digital traffic channels over an asynchronous packet switched network between a transmitter station and a receiver station, the method comprising;

at the transmitter station, selecting a group or profile of encoding algorithms for each said channel from a set of encoding algorithms;

encoding each said channel with an algorithm selected from its corresponding group of algorithms;

multiplexing the encoded channels into a common connection over the asynchronous network;

providing a service specific convergence sublayer (SSCS) selection parameter field incorporating for each said channel a plurality of encoding algorithm identifier fields each indicative of a respective algorithm in the group selected for that channel and carrying further information whereby the receiver station may uniquely identify the algorithm currently in use on that channel;

at a receiving station demultiplexing the encoded channels;

determining from the information in the SSCS parameter field the identity of the encoding algorithm currently employed for that channel; and decoding and recovering each said channel via its respective algorithm.

The service specific convergence sublayer selection parameter field is conveyed via an AAL2 negotiating procedure (ANP) established between the transmitter and receiver for allocating user channels therebetween.

According to another aspect of the invention there is provided a method of transmitting a narrow band digital traffic channel between a transmitter station and a receiver station over an asynchronous broad band network, the method including:

at the transmitting station, selecting a group or profile of encoding algorithms for said channel from a set of encoding algorithms and encoding said channel with an algorithm selected from its corresponding group of algorithms;

performing a negotiation with the receiver station to effect allocation of a transmission channel therebetween;

providing a service specific convergence sublayer (SSCS) selection parameter field incorporating for said channel a plurality of encoding algorithm identifier fields each indicative of an algorithm for use by that channel and conveying that field via the negotiating procedure to the receiver;

packetising the encoded channel into packets and providing each said packet with a header containing information indicative of the algorithm used to encode the channel;

transmitting the packets over the allocated transmission channel to the receiver station;

at the receiver station, storing the service specific convergence sublayer (SSCS) selection parameter field information;

determining from each received packet header and from the stored information the identity of the algorithm employed to encode the channel; and decoding that channel via that algorithm so as to recover the channel.

According to another aspect of the invention there is provided a method of transmitting a narrow band digital traffic channel over an asynchronous packet switched network from a transmitter station to a receiver station, the method comprising;

at the transmitter station selecting a group or profile of encoding algorithms for use on a said channel;

encoding the channel via a said algorithm selected from the group;

packetising the encoded channel into packets or cells;

providing each said packet with a header incorporating information means identifying that algorithm selected from the group and currently in use to encode the channel, according to the information in the SSCS parameter field;

transmitting each said packet from the transmitter station to the receiver station;

at the receiver station, determining from the information received in the SSCS parameter field and the information provided in the header of each said packet the algorithm used to encode the channel; and decoding and recovering the channel via that algorithm.

According to a further aspect of the invention there is provided apparatus for transmitting a plurality of narrow band digital traffic channels over an asynchronous packet switched network, the apparatus comprising;

a transmitting station, having means for selecting a group or profile of encoding algorithms for each said channel from a set of encoding algorithms;

means for encoding each said channel with an algorithm selected from its corresponding group of algorithms;

means for multiplexing the encoded channels into a common connection over the asynchronous network;

means for providing a negotiation procedure between the transmitter and receiver to convey, at the time of setting up individual calls, a service specific convergence sublayer (SSCS) selection parameter field incorporating for each said channel a plurality of encoding algorithm identifier fields each indicative of a respective algorithm in the group that may be selected for that channel at any time during the call;

and a means for providing a unique identification of the algorithm currently in use for a call via information carried in a packet length indicator field and a user to user information (UUI) field within the headers of packets;

and a receiver station, having means for demultiplexing the encoded channels;

means for determining from the information carried in the packet length indicator field and the user to user information field contained in the headers of the packets associated with each said channel the encoding algorithm currently employed for that channel; and means for decoding and recovering each said channel via its respective algorithm.

Typically, the narrow band channels comprise 64 kbit/s or sub-64 kbit/s voice channels.

Identification of an algorithm at the receiver station may be performed implicitly from the packet length indicator, explicitly from a UUI field or from a combination of these techniques.

The technique provides an effective method of encoding and decoding channels using non-standard or custom profiles and of conveying the identity of the encoding algorithm currently in use from the transmitter to the receiver. Furthermore, the technique is fully compatible with existing asynchronous transfer mode standards.

BRIEF DESCRIPTION OF THE DRAWINGS

An embodiment of the invention will now be described with reference to the accompanying drawings in which.

DESCRIPTION OF PREFERRED EMBODIMENT

Figure 1:
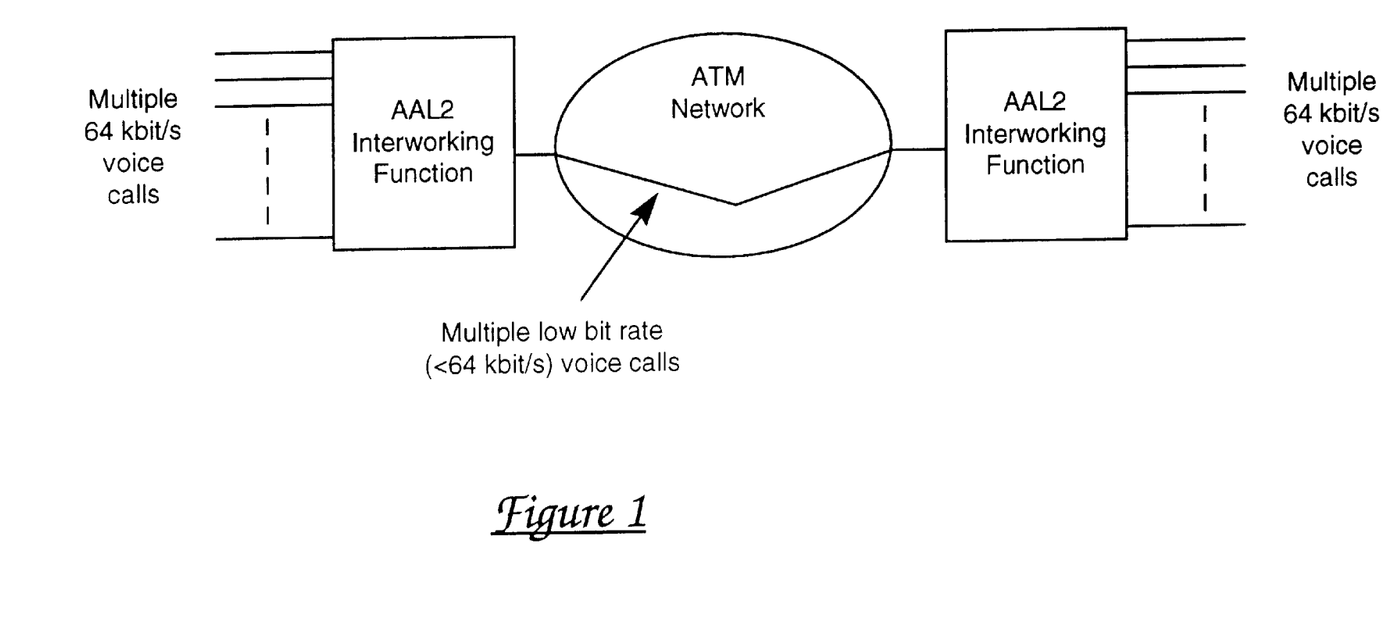
FIG. 1 is a schematic diagram illustrating the transport of voice calls over an ATM network.

Referring first to FIG. 1, narrow band traffic in the form of multiple 64 kbit/s voice calls, e.g. from the PSTN, is transported over an ATM network 11 via first and second AAL2 interworking functions 12a and 12b. The transmitting or ingress IWF 12a encodes the individual voice calls, typically at bit rates lower than 64 kbit/s using an appropriate encoding algorithm for each. It then multiplexes and adapts the encoded voice streams on to an AAL2 ATM connection for transport in ATM packets or cells across the ATM network 11 to the receiving or egress IWF 12b. In the preferred embodiment described herein, the narrow band user traffic is packaged into individual minicells groups of which are then assembled into an ATM cell which is provided with a header containing inter alia information relating to the minicells contained within that ATM cell.

At the egress from the ATM fabric, the receiving IWF performs an inverse operation on the information carried in the AAL2 connection to decode and demultiplex the original 64 kbit/s voice calls for onward transmission in the PSTN (not shown). This requires a delineation process to recover the individual minicells Techniques for performing minicell delineation will be well known to those skilled in the art.

As discussed above, the receiving IWF needs to be aware of the particular encoding algorithm currently in use for each individual narrow band channel so that the corresponding decoding algorithm can be applied thereto so as to recover the original 64 kbit/s voice call. A number of possible algorithms for use during the call is conveyed by the ANP at the time that a call is first set up. The particular coding algorithm currently in use is then indicated by means of the information contained in the minicell headers.

Figure 2:
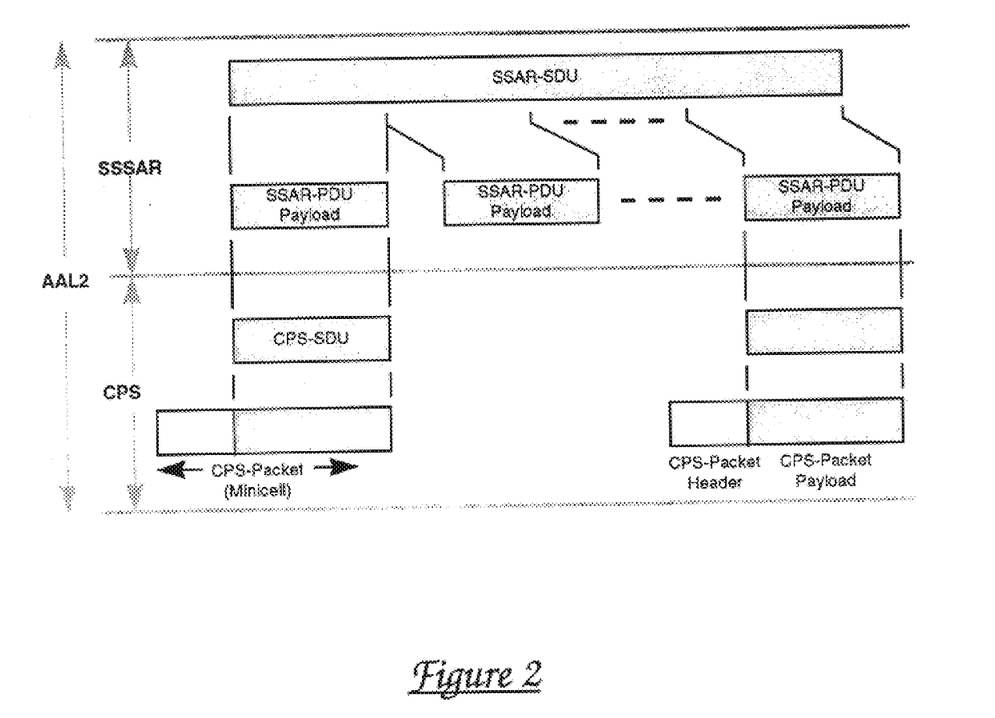
FIG. 2 is a schematic view of the AAL2 protocol.

Referring now to FIG. 2, this illustrates the logical configuration of the AAL2 protocol. This comprises a service specific sublayer (SSSAR) and a common part sublayer (CPS). The service specific sublayer performs a segmentation and re-assembly (SAR) function as required to transport ANP messages containing SSCS selection parameters with multiple algorithm identifiers; the default CPS packet payload length being forty five octets. The protocol provides segmentation of user traffic into minicells each of which is then provided with a header containing appropriate supervisory information. A full description of the AAL2 protocol is given in the aforementioned ITU-T AAL2 I.363.2 standard recommendation the contents of which are incorporated herein by reference.

Figure 3:
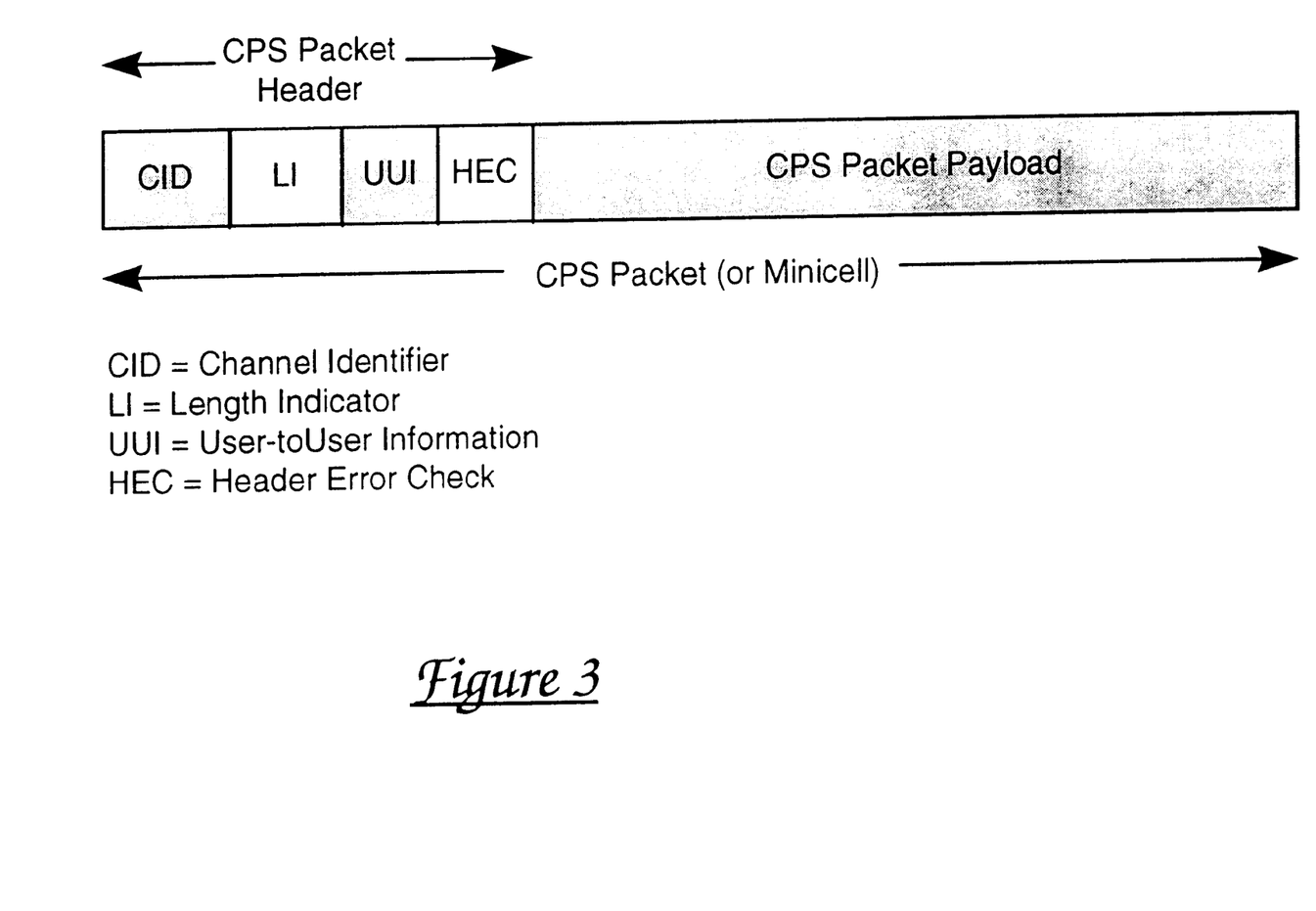
FIG. 3 is a schematic diagram of a minicell, including the header format, used in the network of FIG. 1.

FIG. 3 illustrates the schematic format of a minicell. As can be seen from the figure, the minicell comprises a header portion, comprising a number of information and control fields, and a payload portion carrying the user traffic. The header portion incorporates a channel identifier (CID) field of eight bits, a user to user information (UUI) field of five bits, a length indicator (LI) field of six bits, from which the cell or packet length is determined, and a header error check (HEC) field of five bits that is used for the detection of transmission errors. The UUI field incorporates a sequence number field, which can be used to identify missing or out of sequence cells, and/or a discriminator field which is used to differentiate between encoding algorithms with identical packet lengths as will be described below.

Figure 4:
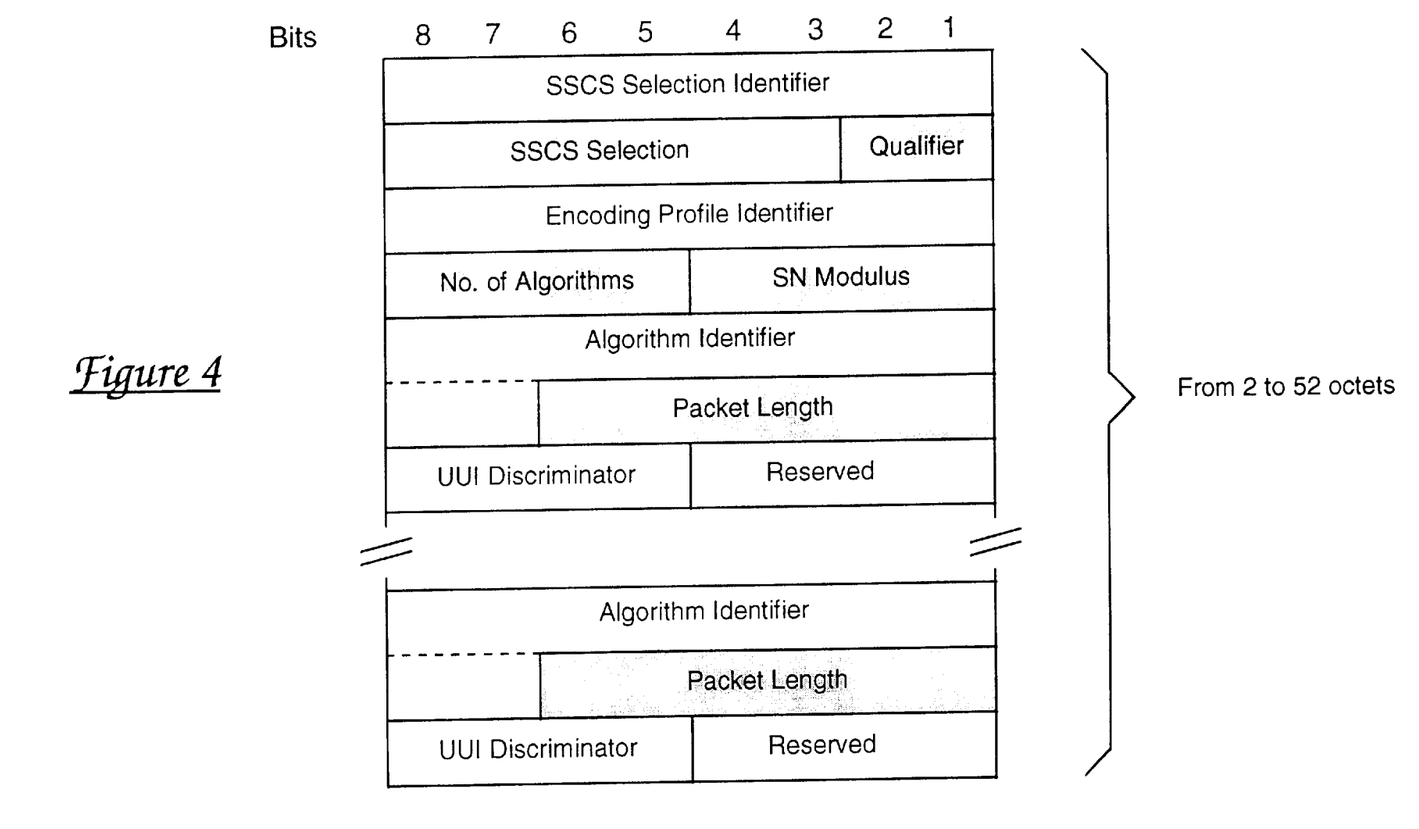
FIG. 4 illustrates the configuration of service specific sublayer selection (SSCS) parameter format employed in the operation of the network of FIG. 1.

Referring now to FIG. 4, this illustrates the format of the SSCS selection parameter field associated with the algorithmic encoding and decoding process. The format comprises a SSCS selection identifier field, an encoding profile field, and a number of algorithm identifier fields one for each algorithm to be used. Typically, these fields are eight bit fields although it will be appreciated that this is in no way essential. The fields shown in FIG. 4 are defined as follows:

Encoding Profile Identifier: this is an 8-bit field, with the all '0's value indicating that this is a non-standard profile, in which case further fields will follow as detailed below. For Profile values between 1 and 128, the field indicates standard (ITU-T defined) profiles. For profile values between 129 and 255, the field indicates proprietary (i.e. vendor-specific) profiles. Values between 1 and 255 indicate that no further fields will follow and the SSCS Selection parameter is complete.

Number of Algorithms: When profiles are not being used, this field indicates the number of algorithms that may be used on the call. The field carries an integer value of up to sixteen, this being the maximum number of algorithms permitted for use on a single call.

Sequence Number Modulus: This field indicates the cell or packet sequence number modulus (as carried in the UUI field of the AAL2 packet header) to be associated with the call. The value carried is a power of two, not exceeding sixteen.

Algorithm Identifier: This field carries an integer value between 0 and 1023 per Annex A of the I.trunk draft standard recommendation and identifies the algorithm by its listed number in that recommendation.

Packet Length: This field (which sets the LI field in CPS packet headers) carries an integer value between 0 and 63 to indicate the length of the packets or minicells resulting from the Algorithm Identifier with which it is associated. Where each encoding algorithm in the profile results in a different packet length, this field is used to identify uniquely to the receiver the algorithm that is currently in use.

PL Discriminator: When different algorithms used within the same call correspond to identical packet lengths, part of the UUI field in the AAL2 packet header is used to enable the receiver to discriminate between these algorithms during reception of data packets. The 4-bit Packet Length Discriminator field in conjunction with the SN Modulus field described above, indicate which bits of the UUI field in the CPS packet headers are significant and how they should be used in the discrimination function performed by the receiver.

Reserved: This is an optional 4-bit field reserved for future standardisation.

Below there follow two examples illustrative of the use of the technique in conveying between peer ATM AAL2 entities the voice encoding algorithms to be used on a call.

EXAMPLE 1

Predefined Profiles

This first example is introduced for comparative purposes. The following standard predefined profile shown in Table 1 below appears in the current version of ITU-T draft recommendation I.trunk

TABLE 1

Standard Predefined Profile

| Explicit Identifier | Packet Length | Description of Algorithm | Unit Interval |
|---|---|---|---|
| 0 | 40 | PCM-64, A-law | 5 msec |
| 20 | 25 | ADPCM-40 | 5 msec |
| 21 | 20 | ADPCM-32 | 5 msec |
| 22 | 15 | ADPCM-24 | 5 msec |
| 23 | 10 | ADPCM-16 | 5 msec |
| 16 | 1 | Generic Silence Insertion Descriptor | 5 msec |

The example in Table 1 is based on the encoding algorithms defined by the ITU-T Recommendation G.726 with a nominal bit rate of 32 kbit/s. At present, the list of predefined profiles in draft Recommendation I.trunk is incomplete and the profiles have not been allocated Encoding Profile Identifiers (EPIs). However, as proposed above, the EPI values associated with standard profiles will lie in the range from 1 to 128. Therefore, for the purposes of this example, it is assumed that a value of 9 has been allocated as the EPI for the algorithms covered in Table 1 above.

Figure 5:
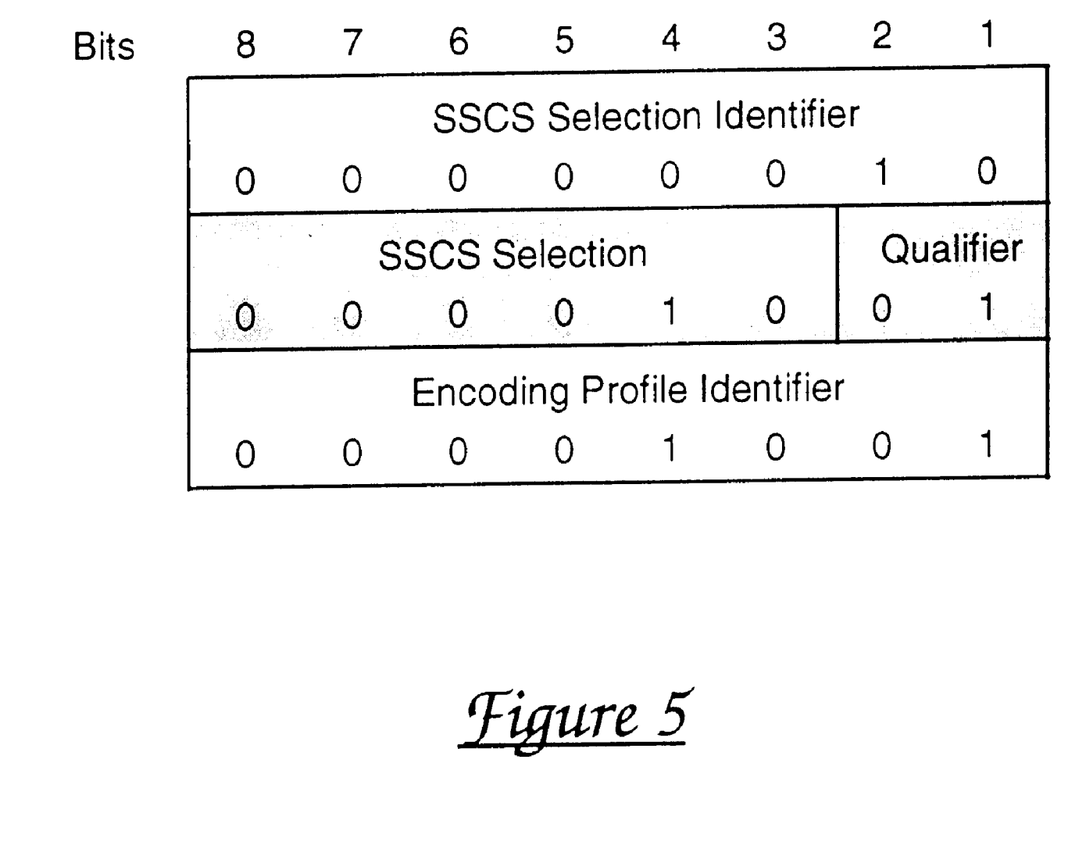
FIG. 5 shows in schematic form a SSCS selection parameter format and structure.

The resulting format and structure for the corresponding SSCS Selection Parameter are as shown in FIG. 5. In FIG. 5, the SSCS Selection and Qualifier fields are coded to indicate that a trunking SSCS without error check will be used for the voice call. The EPI binary value of '9' then indicates the standard predefined profile as shown in Table 1 above. No further fields follow the EPI since this completely specifies all of the encoding algorithms that may be used during the lifetime of the voice call. By way of contrast, in the case of non-standard (vendor specific or custom) predefined profiles the EPI values will lie in the range from 129 to 256.

EXAMPLE 2

Non-standard Profiles

This example exemplifies an embodiment of the present invention. Table 2 below gives an example of a random or non-standard profile, i.e. a profile for which an Encoding Profile Identifier value has not been allocated.

TABLE 2

Random Profile

| Explicit Identifier | Packet Length | Description of Algorithm | Unit Interval |
|---|---|---|---|
| 0 | 16 | PCM-64, A-law | 2 |
| 21 | 16 | ADPCM-32 | 4 msec |
| 27 | 10 | G.728-16 | 5 msec |
| 39 | 10 | G.729-8 | 10 msec |

The four algorithms identified in Table 2 are all defined in ITU-T Recommendations. The corresponding format and structure for the SSCS Selection Parameter are as shown in FIG. 6.

Figure 6:
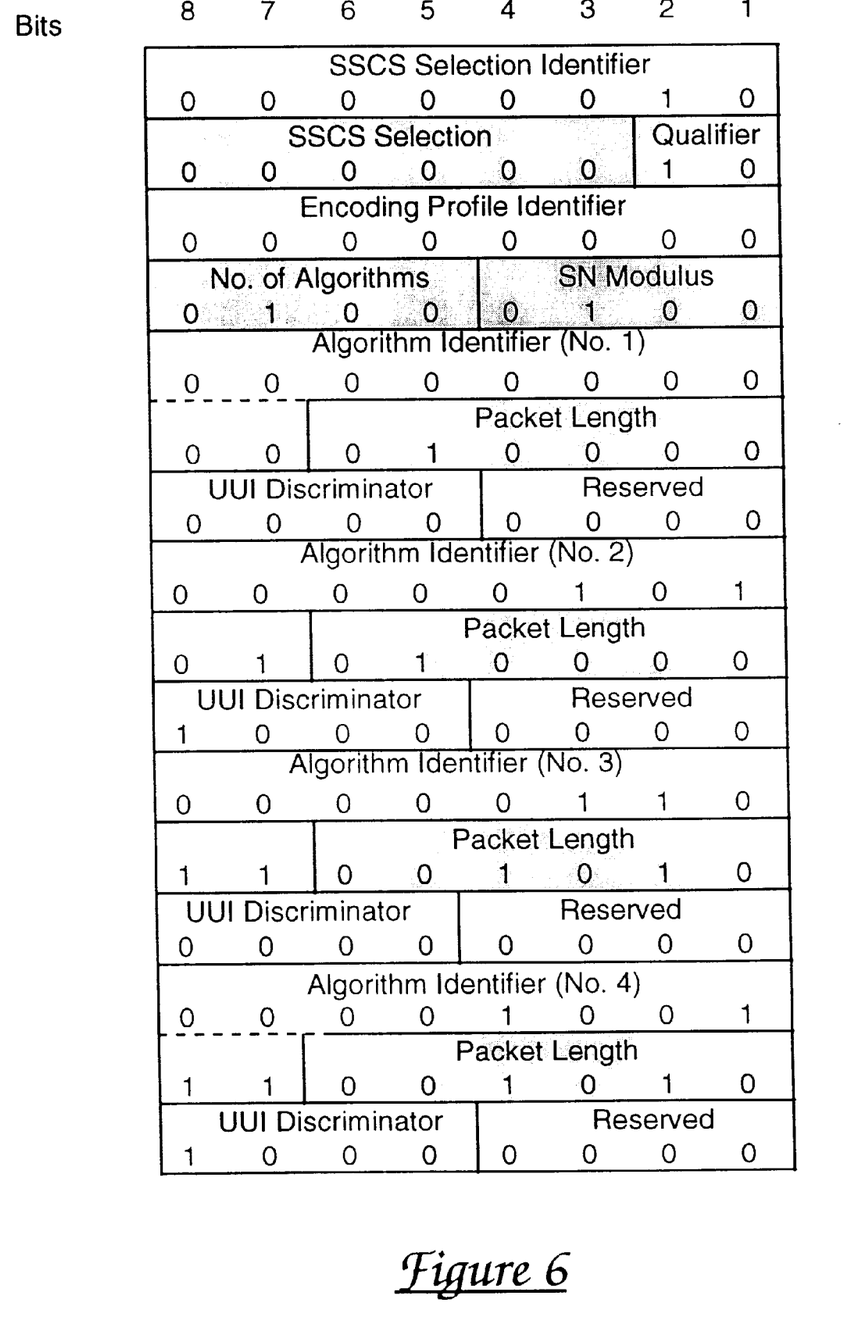
FIG. 6 shows a SSCS selection parameter format and structure according to an embodiment of the invention.

In FIG. 6, the first three fields—SSCS Selection Identifier, SSCS Selection and Qualifier—are identical with the same fields shown in FIG. 4 above. In FIG. 6 the all-zeros Encoding Profile Identifier field indicates that a random profile is being conveyed and that further fields will therefore follow.

The Number of Algorithms field is coded as binary '4' (0100) to indicate that four algorithms are to follow.

The Sequence Number Modulus field carries the value of binary '8' (1000), indicating a 3-bit Sequence Number will be used in AAL2 packets during the call.

The first Algorithm Identifier carries the binary value '0' (per ITU-T draft Recommendation I.trunk) to indicate the 64 kbit/s PCM A-law algorithm. The Packet Length field shows that 16 octet AAL2 packets will be used with this algorithm and the PL Discriminator and Reserved fields are both coded as '0'.

The second Algorithm Identifier carries the binary value '21' (per I.trunk) to indicate the 32 kbit/s ADPCM algorithm. The Packet Length field shows that 16 octet AAL2 packets will be used with this algorithm. The PL Discriminator field is coded as binary '16' to distinguish the 16 octet ADPCM packets from the 16 octet PCM A-law packets. The Reserved field is coded as '0'.

The third Algorithm Identifier carries the binary value '27' (per I.trunk) to indicate the 16 kbit/s G.728 algorithm. The Packet Length field shows that 10 octet AAL2 packets will be used with this algorithm and the PL Discriminator and Reserved fields are both coded as '0'.

The fourth Algorithm Identifier carries the binary value '39' (per I.trunk) to indicate the 8 kbit/s G.729 algorithm. The Packet Length field shows that 10 octet AAL2 packets will be used with this algorithm. The PL Discriminator field is coded as binary '16' (10000) to distinguish the 10 octet G.728 packets from the 10 octet G.729 packets. The Reserved field is coded as '0'.

In the above example, the four algorithms use only two different packet lengths and this permits a Sequence Number of modulus 8 (three bits of the UUI field) to be carried by the AAL2 packets. The fourth bit of the UUI field enables the two sets of algorithms with the same packet lengths to be distinguished, as indicated by the PL Discriminator. In cases where none of the algorithms have identical packet lengths, all four UUI bits can be used to provide a modulo-16 Sequence Number. Note that the fifth bit of the UUI field is used to indicate other (i.e. non-standard voice or data) packet types. Note that up to 16 algorithms may be conveyed with identical packet lengths, but this would consume all four available bits of the UUI field in distinguishing between the algorithms. It would not then be possible to provide Sequence Numbers via the UUI field in AAL2 Type 1 packets. This would require the use of AAL2 Type 2 packets with the attendant increase in protocol overhead: this is preferably avoided whenever possible. Thus, for Type 1 packets the aim should be to have no more than eight different algorithms with the same packet lengths to ensure at least a modulo-2 Sequence Number.

These examples illustrate the efficacy of the technique in carrying algorithm identifying information between a transmitter and a receiver station over an asynchronous network.

It will be understood that although the technique has been described with particular reference to the ATM AAL2 standard, its use is in no way limited to this particular protocol.

We claim:

1. A method of transmitting a plurality of narrow band digital traffic channels in packets over an asynchronous (ATM) packet switched network between a transmitter station and a receiver station, wherein each said channel is encoded via a selected one of a set of encoding algorithms associated with that channel, so as to reduce the bit rafts of that channel, wherein each said encoded channel is packetised into minicells, groups of which minicells are assembled into ATM cells, wherein the identity of the algorithms in each channel set of algorithms is conveyed to the receiver at call set-up between the transmitter and receiver, and wherein the identity of that algorithm employed to encode a said channel is conveyed via header information provided in the packets carrying the channel.

2. A method of transmitting a plurality of narrow band digital traffic channels over an asynchronous (ATM) packet switched network between a transmitter station and a receiver station, the method comprising:

at the transmitter station, selecting a group or profile of encoding algorithms for each said channel from a set of encoding algorithms;

encoding each said narrow band channel with an algorithm selected from its corresponding group of algorithms so as to reduce the bit rate of that channel;

multiplexing the encoded channels into a common connection over the asynchronous network by packetising the encoded channels into minicells groups of which minicells are assembled into ATM cells;

providing a service of specific convergence sublayer (SSCS) selection parameter field incorporating for each said narrow band channel a plurality of encoding algorithm identifier fields each indicative of a respective algorithm in the group selected for that channel and carrying further information whereby the receiver station may uniquely identify the algorithm currently in use on that channel;

at a receiver station demultiplexing the encoded channels for the ATM cells;

determining from the information in the SSCS parameter field the identity of the encoding algorithm currently employed for that channel; and decoding and recovering each said narrow band channel via its respective algorithm.

3. A method of transmitting a narrow band digital traffic channel over an asynchronous (ATM) packet switched network from a transmitter station to a receiver station, the method comprising:

at the transmitter station selecting a group or profile of encoding algorithms for use on a said channel;

encoding the channel via a said algorithm selected from the group so as to reduce the bit rate of that channel;

packetising the encoded channel into packets or cells;

providing each said packet with a header incorporating information means identifying that algorithm selected from the group and currently in use to encode the channel;

transmitting each said packet from the transmitter station to the receiver station;

at the receiver station, determining from the information means provided in the header of each said packet the algorithm used to encode the channel; and     decoding and recovering the narrow band channel via that algorithm.

4. A method as claimed in claim 3, wherein said channel is encoded via a first algorithm selected from the group for a first time period and is encoded via a further algorithm selected from the group for a subsequent time period.

5. A method as claimed in claim 4, wherein the algorithm used to encode the channel is identified via a length indicator field contained in the packet header.

6. A method as claimed in claim 4, wherein the algorithm used to encode the channel is identified via a discriminator field contained in the packet header.

7. A method as claimed in claim 6, wherein the discriminator field is contained in a user to user information (UUI) field contained in the packet header.

8. A method as claimed in 4, wherein said narrow band channels are 64kbit/s or sub-64 kbit/s voice channels.

9. A method as claimed in 7, wherein said narrow band channels are 64kbit/s or sub-64 kbit/s voice channels.

10. A method as claimed in 3, wherein each said packet comprises an asynchronous transfer mode minicell.

11. A method of transmitting a plurality of narrow band digital traffic channels over an asynchronous (ATM) packet switched network between a transmitter station and a receiver station, there being a negotiating procedure between the transmitter and receiver stations for allocating user channels therebetween, the method comprising:

at the transmitter station, selecting a group or profile of encoding algorithms for each said channel from a set of encoding algorithms;

encoding each said channel with an algorithm selected from its corresponding group of algorithms so as to reduce the bit rate of that channel;

multiplexing the encoded channels into a common connection over the asynchronous network by packetising the encoded channels into minicells, group of which minicells are assembled into ATM cells;

providing via the negotiation procedure between the transmitter and receiver to convey, at the time of setting up individual calls, a service specific convergence sublayer (SSCS) selection parameter field incorporating for each said narrow band channel a plurality of encoding algorithm identifier fields each indicative of a respective algorithm in the group that may be selected for that channel at any time during the call so as to uniquely identify the algorithm currently in use for that call;

at the receiver station, demultiplexing the encoded channels for the ATM cells;

determining from the headers of the packets associated with each said channel and from the service specific convergence sublayer (SSCS) selection parameter field information associated with that channel the encoding algorithm currently employed for that channel; and     decoding and recovering each said narrow band channel via its respective algorithm.

12. A method of transmitting a plurality of narrow band digital traffic channels over an asynchronous (ATM) packet switched network between a transmitter station and a receiver station, there being a negotiating procedure between the transmitter and receiver stations for allocating user channels therebetween, the method comprising:

at the transmitter station, selecting an encoding algorithm for each said channel from a set of encoding algorithms;

encoding each said channel with its selected algorithm so as to reduce the bit rate of that channel;

multiplexing the encoded channels into a common connection over the asynchronous network by packetising the encoded channels into minicells, groups of which minicells are assembled into ATM cells;

providing a service specific convergence sublayer (SSCS) selection parameter field conveyed via the negotiating procedure and incorporating for each said channel a plurality of encoding algorithm identifier fields each indicative of an algorithm for use by that channel; a packet length indicator field indicative of the packet payload length associated with a particular coding algorithm, a sequence number modules field, and a packet length discriminator field which together indicate both the sequence number modules for use in the packets during the call and a means by which coding algorithms associated with identical packet lengths may be distinguished;

changing form one encoding algorithm to another for a said narrow band channel during a call;

at the receiver station, demultiplexing the encoded channels from the ATM cells;

determining from the packet header associated with each said channel and in and from the service specific convergence sublayer (SSCS) selection parameter field information associated with that channel the encoding algorithm currently employed for that channel; and decoding that narrow band channel via that algorithm.

13. A method of transmitting a narrow band digital traffic channel between a transmitter station and a receiver station over an asynchronous (ATM) broad band network, the method including:

at the transmitter station, selecting a group or profile of encoding algorithms for said channel from a set of encoding algorithms and encoding said channel with an algorithm selected from its corresponding group of algorithms so as to reduce bit rate of that channel;

performing a negotiation with the receiver station to effect allocation of a virtual circuit connection therebetween;

providing a service specific convergence sublayer (SSCS) selection parameter field incorporating for said channel a plurality of encoding algorithm identifier fields each indicative of an algorithm for use by that channel and conveying that field via the negotiating procedure to the receiver;

packetising the encoded channel into packets and providing each said packet with a header containing information indicative of the algorithm used to encode the channel;

transmitting the packets over the allocated transmission channel to the receiver station;

at the receiver station, storing the service specific convergence sublayer (SSCS) selection parameter field information;

determining from each received packet header and from the stored information the identity of the algorithm employed to encode the narrow band channel; and decoding that channel via that algorithm so as to recover the channel.

14. Apparatus for transmitting a plurality of narrow band digital traffic channels over an asynchronous (ATM) packet switched network, the apparatus comprising:

a transmitter station, having means for selecting a group or profile of encoding algorithms for each said channel from a set of encoding algorithms;

means for encoding each said channel with an algorithm selected from its corresponding group of algorithms so as to reduce the bit rate of that channel;

means for multiplexing the encoded channels into a common connection over the asynchronous network by packetising the encoded channels into minicells, groups of which minicells are assembled into ATM cells;

means for providing a negotiation procedure between the transmitter and receiver to convey, at the time of setting up individual calls, a service specific convergence sublayer (SSCS) selection parameter field incorporating for each said channel a plurality of encoding algorithm identifier fields each indicative of a respective algorithm in the group that may be selected for that narrow band channel at any time during the call;

and a means for providing a unique identification of the algorithm currently in use for a call via information carried in a packet length indicator field and a user to user information (UUI) field within the headers of packets;

and a receiver station having means for demultiplexing the encoded narrow band channels from the ATM cells;

means for determining from the information carried in the packet length indicator field and the user to user information contained in the headers of the packets associated with each said channel the encoding algorithm currently employed for that channel; and means for decoding and recovering each said narrow band channel via its respective algorithm.

* * * * *